(No Model.)

T. PATES.

PLANTING PLOW.

No. 257,376. Patented May 2, 1882.

WITNESSES.
William Sluyter
H. B. Hobart

INVENTOR.
Thomas Pates.
by John Lane.
His Atty.

UNITED STATES PATENT OFFICE.

THOMAS PATES, OF ALTON, ILLINOIS, ASSIGNOR TO HAPGOOD PLOW COMPANY, OF SAME PLACE.

PLANTING-PLOW.

SPECIFICATION forming part of Letters Patent No. 257,376, dated May 2, 1882.

Application filed November 28, 1881. (No model.)

*To all whom it may concern:*

Be it known that I, THOMAS PATES, of Alton, in the county of Madison and State of Illinois, have invented a new and useful Improvement in Planting-Plows, which improvement is fully set forth in the following specification and accompanying drawings.

Figure 1:
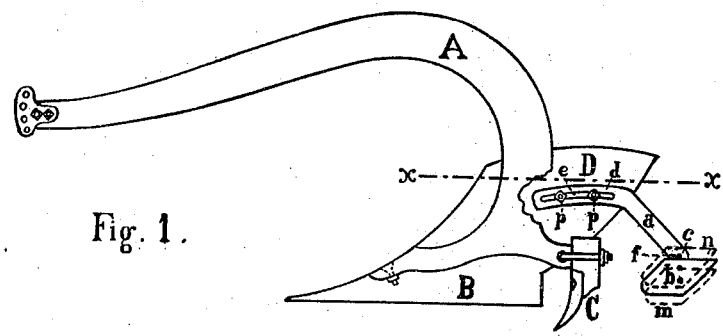
Figure 2:
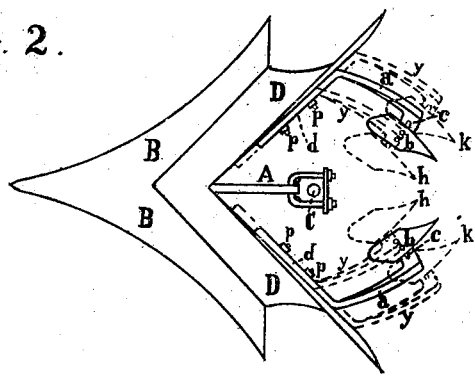
Figure 3:
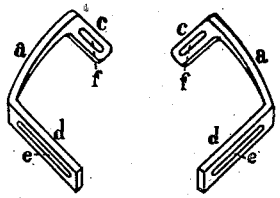
Figure 4:
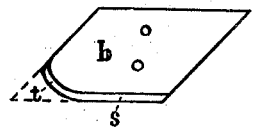

Figure 1 is a side view of a planting-plow, showing how the drag-bars a are attached to the mold-board, also showing the coverers adjustable up and down in their attachment to the drag-bar. Fig. 2 is a top view of the same as Fig. 1, taken on the dotted line x x in Fig. 1, showing how the drag-bars are adjustable on the mold-board, whereby the coverers are adjusted nearer to each other and farther apart by the movement of the drag-bars on the mold-boards. Fig. 3 is a perspective view of the drag-bars, showing the slotted ends c and d. Fig. 4 is a face view of the coverer.

This invention consists in the peculiar construction, combination, and arrangement of the drag-bars, adjustably attached to the mold-board in such a manner that a movement of the drag-bars forwardly on the mold-boards will bring and adjust the coverers nearer to each other, and a movement of the drag-bars rearwardly will adjust the coverers wider and farther from each other, as hereinafter shown.

The drag-bar consists of a bar of iron or steel of suitable length, having its forward end fitting the mold-board and adjustably attached thereto, and extending rearwardly, and with its rear end bent downwardly and supporting the coverer. a is the drag-bar, having a forward end part, d, with a slot, e, as shown in Fig. 3, and having a rear part, c, with a slot, f, as also shown in Fig. 3. The forward end part, d, is attached to the mold-board B with two bolts in the slot e, and is adjustable thereon, by which the drag-bars may be moved forward and back, as shown in dotted line y y in Fig. 2, the slot e, sliding on the bolts p p, carrying the coverer b from dotted line h to dotted line k, also shown in Fig. 2, by which the coverers may be moved and adjusted to work either close to each other or wider apart from each other, as desired.

The rear end part, c, extends downwardly, supporting the coverers b with bolts in the slots f, and the coverer may be adjusted up and down by the bolts which secure the coverer sliding in the slots f, moving the coverer from dotted line m to dotted line n, as shown in Fig. 1, by which deep or shallow work may be done, as desired. A series of holes may be used in the place of the slots with like results and still retain the feature of my invention.

The plow-beam A, listing-plow B, mold-boards D, and drill-tooth C, with the coverer b, (shown in the drawings,) do not differ from ordinary construction, and need not be herein described.

By reason of my invention the coverers may be adjusted for either a wide or a narrow ridge-row, and with either a shallow or a deep covering in either a wide or narrow ridge-row, as may be desired.

I am aware that drag-bars have been attached to the mold-board, and I am aware that drag-bars have been made adjustable. Therefore such I do not claim broadly.

In operation, when the coverers are working near together they will be adjusted to work shallow, and when working wide ridge-rows they must work deeper. Hence it is desirable that the coverers have adjustability both perpendicularly and laterally, as shown in my invention, and which I accomplish by attaching the drag-bars to the mold-boards and making them adjustable thereon, as shown.

Having thus described and set forth my invention, what I desire to secure by Letters Patent is—

In a planting-plow, the drag-bar a, having its forward end bent and slotted, fitting the back of the mold-board and adjustably attached thereto, and the rear end bent downwardly and slotted, and fitting the back of the covering-blades, and adjustably attached thereto, substantially as and for the purpose set forth.

THOMAS PATES.

Witnesses:
F. H. FERGUSON,
WM. R. PINCKARD.